US008155462B2

(12) United States Patent  (10) Patent No.: US 8,155,462 B2
Tran et al.  (45) Date of Patent: Apr. 10, 2012

(54) SYSTEM OF MASTER RECONSTRUCTION SCHEMES FOR PYRAMID DECOMPOSITION

(75) Inventors: Trac D. Tran, Columbia, MD (US); Lijie Liu, Skillman, NJ (US); Pankaj N. Topiwala, Clarksville, MD (US)

(73) Assignee: FastVDO, LLC, Columbia, MD (US)

( * ) Notice: Subject to any disclaimer, the term of this patent is extended or adjusted under 35 U.S.C. 154(b) by 939 days.

(21) Appl. No.: 11/968,030

(22) Filed: Dec. 31, 2007

(65) Prior Publication Data

US 2008/0175500 A1  Jul. 24, 2008

Related U.S. Application Data

(60) Provisional application No. 60/877,850, filed on Dec. 29, 2006.

(51) Int. Cl.
    *G06K 9/36* (2006.01)
(52) U.S. Cl. .................................................. 382/240
(58) Field of Classification Search .......... 382/162, 382/166, 232–233, 238–240, 260; 708/298, 708/300, 308, 313
    See application file for complete search history.

(56) References Cited

U.S. PATENT DOCUMENTS

| | | | | |
|---|---|---|---|---|
| 4,698,843 A * | 10/1987 | Burt et al. | ............... | 382/275 |
| 4,797,942 A * | 1/1989 | Burt | ............... | 382/284 |
| 5,325,449 A * | 6/1994 | Burt et al. | ............... | 382/240 |
| 5,488,674 A * | 1/1996 | Burt et al. | ............... | 382/284 |
| 6,125,201 A * | 9/2000 | Zador | ............... | 382/166 |
| 6,421,464 B1 | 7/2002 | Tran et al. | | |
| 6,453,073 B2 * | 9/2002 | Johnson | ............... | 382/239 |
| 6,567,564 B1 * | 5/2003 | van der Wal | ............... | 382/260 |
| 7,149,358 B2 * | 12/2006 | Langan | ............... | 382/214 |

OTHER PUBLICATIONS

P.J. Burt and E.H. Adelson, "The Laplacian pyramid as a compact image code," IEEE Trans. Commun., vol. COM-31, pp. 532-540, Apr. 1983.
P.P Vaidyanathan, Multirate Systems and Filter Banks, Prentice Hall, 1993.
M. Vetterli and J. Kovacevic, Wavelets and Subband Coding, Prentice Hall, 1995.
Z. Cvetkovic and M. Vetterli, "Oversampled Filter Banks", IEEE Trans. Signal Processing, vold 46, No. 5, pp. 1245-1255, May 1998.
S. Mallat, A Wavelet Tour of Signal Processing, Second Edition, Academic Press, 1999.
D. Taubman and M. Marcellin, JPEG2000: Image Compression Fundamentals, Practice and Standards, Kluwer Academic Publishers, 2001.
M.N.Do and M. Vetterli, "Frame Pyramid," IEEE Trans. Signal Processing Mag., 2007.
D. Santa-Criz, J. Reichel, and F. Ziliani, "Opening the Laplacian Pyramid for Video Coding," Proc. ICIP, pp. 672-675 Sep. 2005.
M. Flierl and P. Vanderghyenst, "An Improved Pyramid for Spatially Scalable Video Coding," in Proc. IEEE International Conference on Image Processing, Genova, Italy, Sep. 2005, vol. 2, pp. 878-881.
L. Gan and C. Ling, "Computation of the Dual Frame: Forward and Backward Greville Formulas", Proc. IEEE Int. CASSP, 2007. L. Liu, L. Gan, and T.D. Tran, "General Reconstruction of Laplacian Pyramid and its Dual Frame Solutions," 41$^{st}$ Conf. on Info Sci. and Sys., Baltimore, MD, Mar. 2007.
H. Schwarz, D. Marpe, and T. Wiegand, "Overview of the Scalable Extension of the H.264/MPEG-4 AVC Video Coding Standard," IEEE Trans. Circuits Syst. Video Tech., Sep. 2007.
J. Kovacevic and A. Chebira, "Life Beyond Bases: The Advent of Frames," IEEE Signal Processing Mag., 2007.

* cited by examiner

*Primary Examiner* — Jose Couso
(74) *Attorney, Agent, or Firm* — Dickstein Shapiro LLP

(57) ABSTRACT

A reconstruction system for digital signals processed by the laplacian pyramid including a master lifting-based parameterization reconstruction scheme. The system also involves the design of low-complexity FIR linear-phase integer-coefficient filtering operators for lapacian pyramid decimation and interpolation stages that deliver a minimum mean-squared error reconstruction.

42 Claims, 15 Drawing Sheets

| Filter Length | Filter Coefficients/Elements |
|---|---|
| 5 | [ -1  2  6  2  -1 ] / 8 |
| 9 | [1  -1  -3  9  20  9  -3  -1  1]/32 |
| 9 | [1  0  -8  16  46  16  -8  0  1]/64 |
| 11 | [1  0  -3  0  10  16  10  0  -3  0  1]/32 |
| 17 | [1  -1  -6  4  18  -28  -34  152  300  152  -34  -28  18  4  -6  -1  1]/512 |
| 4 | [ -1  3  3  -1 ] / 4 |
| 6 | [-3  1  18  18  1  -3]/32 |
| 8 | [ -1  -1  9  25  25  9  -1  -1]/64 |
| 8 | [ 3  -9  -7  45  45  -7  -9  3 ] / 64 |
| 8 | [7  -11  -9  77  77  -9  -11  7]/128 |
| 10 | [1  0  -3  6  28  28  6  -3  0  1]/64 |

FIG. 15

| Filter Length | Filter Coefficients/Elements |
|---|---|
| 3 | [1  2  1]/2 |
| 5 | [-1  2  6  2  -1]/4 |
| 7 | [-1  0  9  16  9  0  -1]/16 |
| 7 | [-1  0  5  8  5  0  -1]/8 |
| 11 | [1  0  -4  0  19  32  19  0  -4  0  1]/32 |
| 11 | [3  0  -25  0  150  256  150  0  -25  0  3]/256 |
| 4 | [1  3  3  1]/4 |
| 6 | [1  5  10  10  5  1]/16 |
| 8 | [-1  -1  9  25  25  9  -1  -1]/32 |
| 10 | [1  0  -3  6  28  28  6  -3  0  1]/32 |

FIG. 16

| n | 0 | +/- 1 | +/- 2 | +/- 3 | +/- 4 | +/- 5 | +/- 6 |
|---|---|---|---|---|---|---|---|
| L[n] | 26 | 19 | 5 | -3 | -4 | 0 | 2 |

FIG. 17

|  | $m$ | $2^{12}$ | $2^{14}$ | $2^{16}$ |
|---|---|---|---|---|
| Barbara | REC-1 | 9.43 | 12.60 | 21.55 |
| | REC-2 | 8.80 | 11.38 | 15.67 |
| | REC-3 | 9.63 | 12.96 | 22.22 |
| Goldhill | REC-1 | 11.28 | 15.68 | 23.72 |
| | REC-2 | 10.27 | 12.72 | 15.20 |
| | REC-3 | 11.69 | 15.54 | 22.04 |
| Peppers | REC-1 | 13.37 | 18.80 | 25.78 |
| | REC-2 | 11.43 | 14.03 | 15.31 |
| | REC-3 | 13.75 | 19.35 | 26.29 |

FIG. 18

SYSTEM OF MASTER RECONSTRUCTION SCHEMES FOR PYRAMID DECOMPOSITION

CROSS-REFERENCE TO RELATED APPLICATIONS

This application claims priority to provisional U.S. patent application entitled, High-Performance Low-Complexity Re-Sampling Filters For Scalable Video Codec, filed Dec. 29, 2006, having a Ser. No. 60/877,850, the disclosure of which is hereby incorporated by reference in its entirety. U.S. Pat. No. 6,421,464, entitled "Fast Lapped Image Transforms Using Lifting Steps," is also hereby incorporated by reference in its entirety.

FIELD OF THE INVENTION

The present invention relates generally to the processing of uni- and multi-dimensional discrete signals such as audio, radar, sonar, natural images, photographs, drawings, multi-spectral images, volumetric medical image data sets, video sequences, etc, at multiple resolutions that are captured directly in digital format or after they have been converted to or expressed in digital format. More particularly, the present invention relates to the processing of image/video (visual) data and the use of novel decomposition and reconstruction methods within the pyramid representation framework for digital signals that have been contaminated by noise.

BACKGROUND OF THE INVENTION

Multi-scale and multi-resolution representations of visual signals such as images and video are central for image processing and multimedia communications. They closely match the way that the human visual system processes information, and can easily capture salient features of signals at various resolutions. Moreover, multi-resolution algorithms offer computational advantages and usually have more robust performance. For example, as a scalable extension of video coding standard H.264/MPEG-4 AVC, the SVC standard has achieved a significant improvement in coding efficiency, as well as the degree of scalability relative to the scalable profiles of previous video coding standards. The basic structure for supporting the spatial scalability in this new standard is the well-known Laplacian Pyramid.

The Laplacian Pyramid (hereinafter "LP"), also called Laplace Pyramid in the current literature, and introduced by P. J. Burt and E. H. Adelson in 1983, is a fundamental tool in image/video processing and communication. It is intimately connected with resampling such that every pair of up sampling and down sampling filters corresponds to an LP, by computing the detail difference signal at each step. Vice versa, by throwing away the detail signal, up- and down-sampling filters result. Traditionally, LPs have been focused on resamplings of a factor of 2, but the construction can be generalized to other ratios. In the most general setting, non-linear operators can be employed to compute the coarse approximation as well as the detail signals. The LP is one of the earliest multi-resolution signal decomposition schemes. It achieves the multi-scale representation of a signal as a coarse signal at lower resolution together with several detailed signals as successive higher resolution.

This is demonstrated in FIG. 1 where H(z) 14 is often called the Decimation Filter and G(z) 16 is often referred to as the Interpolation Filter. Such a representation is implicitly using over-sampling. Hence, in compression applications, it is normally replaced by sub-band coding or the wavelet transform, which are all critically-sampled decomposition schemes.

The LP is the foundation for spatial scalability in numerous video coding standards, such as MPEG-2, MPEG-4, and the recent H.264 Scalable Video Coding (SVC) standard propounded in the September 2007 article entitled "Overview of the scalable extension of the H.264/MPEG-4 AVC video coding standard", by H. Schwarz, D. Marpe, and T. Wiegand. The LP provides an over-complete representation of visual signals, which can capture salient features of signals at various resolutions. It is an implicitly over-sampling system, and can be characterized as an over-sampled filter bank (hereinafter "FB") or frame. As the inverse of an over-sampled analysis FB, beside the conventional reconstruction scheme depicted in FIG. 2, the LP reconstruction actually has an infinite number of realizations that can satisfy the perfect reconstruction (hereinafter "PR") property. Despite the sampling redundancy, the LP still has its occasional advantages over the critically sampled wavelet scheme. In the LP, each pyramid level only down-samples the low-pass channel and generates one band-pass signal. Thus, the resulting signal does not suffer from the "scrambled" frequencies, which normally exist in critical sampling scheme because the high-pass channel is folded back into the low frequency after sampling. Therefore, the LP enables further decomposition to be employed on its band-pass signals, generating some state-of-the-arts multi-resolution image processing and analysis tools.

The LP decomposition framework provides a redundant representation and thus has multiple reconstruction methods. Given an LP representation, the original signal usually can be reconstructed simply by iteratively interpolating the coarse signal and adding the detail signals successively up to the final resolution. However, when the LP coefficients are corrupted with noise, such reconstruction method can be shown to be suboptimal from a filter bank point of view. Treating the LP as a frame expansion, M. N. Do and M. Vetterli proposed in 2003 a frame-based pyramid reconstruction scheme, which has less error than the usual reconstruction method. They presented from frame theory a complete parameterization of all synthesis FBs that can yield PR for a given LP decomposition with a decimation factor M. Such a general LP reconstruction has $M^2+M$ free parameters. Moreover, they revealed that the traditional LP reconstruction is suboptimal, and proposed an efficient frame-based LP reconstruction scheme. However, such frame reconstruction approaches require the approximation filter and interpolation filter to be biorthogonal in order to achieve perfect reconstruction. Since a biorthogonal filter can cause significant aliasing in the down-sampled lowpass subband, it may not be advisable for spatially scalable video coding.

To keep the same reconstruction scheme but overcome the bi-orthogonality limitation in the frame-based pyramid reconstruction, a method called lifted pyramid was presented by M. Flierl and P. Vandergheynst in 2005 to improve scalable video coding efficiency. Therein, the lifting steps are introduced into pyramid decomposition and any filters can be applied to have perfect reconstruction. The lifted pyramid introduced an additional lifting step into the LP decomposition so that the perfect reconstruction condition can be satisfied. where the lifting steps are introduced into pyramid decomposition and any filters can be applied to have perfect reconstruction. When compared to the conventional LP, however, the low-solution representation of the lifted pyramid has more significant high-frequency components and requires larger bit rate because of the spatial update step in the decomposition. Thus, it is undesirable in the context of scalable video compression.

A similar modified LP scheme called Laplacian Pyramid with Update (hereinafter "LPU") was presented by D. Santa-Cruz, J. Reichel, and F. Ziliani in 2005 to improve scalable coding efficiency. However, the LPU still needs to change the low-pass subband LP coefficients due to the spatial update step in the decomposition procedure. Hence, it has the same problem as the aforementioned lifted pyramid method. The present invention solves the long felt needs of the prior art attempts and presents novel methods that offer a variety of unanticipated benefits.

Accordingly, it is desirable to provide advanced methods for resampling and reconstruction within the pyramid representation framework for digital signals. Such signals may be contaminated by noise, either from quantization as in compression applications, from transmission errors as in communications applications, or from display-resolution limit adaptation as in multi-rate signal conversion. The methods of the present invention offer enhanced reconstruction.

SUMMARY OF THE INVENTION

The foregoing needs are met, to a great extent, by the present invention, wherein in one aspect an apparatus is provided that in some embodiments provide advanced methods for resampling and reconstruction within the pyramid representation framework for digital signals.

In accordance with one embodiment of the present invention, an optimal laplace pyramid processing system is presented herein for processing digital signal elements selected from a set of dimensions within a signal, comprising a laplace pyramid decomposition stage, and intermediate stage, and a laplacian pyramid reconstruction stage. The laplace pyramid decomposition stage includes a decimation having a signal as an input and a coarse approximation of the signal as an output, and an interpolation having the coarse approximation as an input and a detail signal as an output. The laplacian pyramid reconstruction stage has the coarse approximation and detail signal as inputs and a reconstructed signal as an output, wherein the decimation retains maximum energy in the coarse approximation and the reconstructed signal is simultaneously a minimum mean square error approximation of the original signal.

In accordance with another embodiment of the present invention, An enhanced reconstruction laplacian pyramid processing system for processing a plurality digital signal elements selected from any set of dimensions within at least one signal, comprising a laplacian pyramid decomposition stage, an intermediate stage, a laplacian pyramid reconstruction stage, and an enhanced reconstruction stage. The laplacian pyramid decomposition stage includes a decimation having a signal as an input and a coarse approximation of the signal as an output, and an interpolation having the coarse approximation as an input and a detail signal as an output. The laplacian pyramid reconstruction stage has the coarse approximation and detail signal as inputs, and a reconstructed signal as an output. The enhanced reconstruction stage has the coarse approximation and reconstructed signal as inputs and an enhanced reconstructed signal as an output.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 15 shows the filter taps of a plurality of down-sampling low-pass filters in accordance with the present invention.

FIG. 16 shows the filter taps of a plurality of up-sampling low-pass filters in accordance with the present invention.

FIG. 17 presents a 13-tap low-pass filter in SVC and its coefficients.

FIG. 18 presents a comparison of de-noising performances of various LP reconstruction schemes.

DETAILED DESCRIPTION

Figure 1:
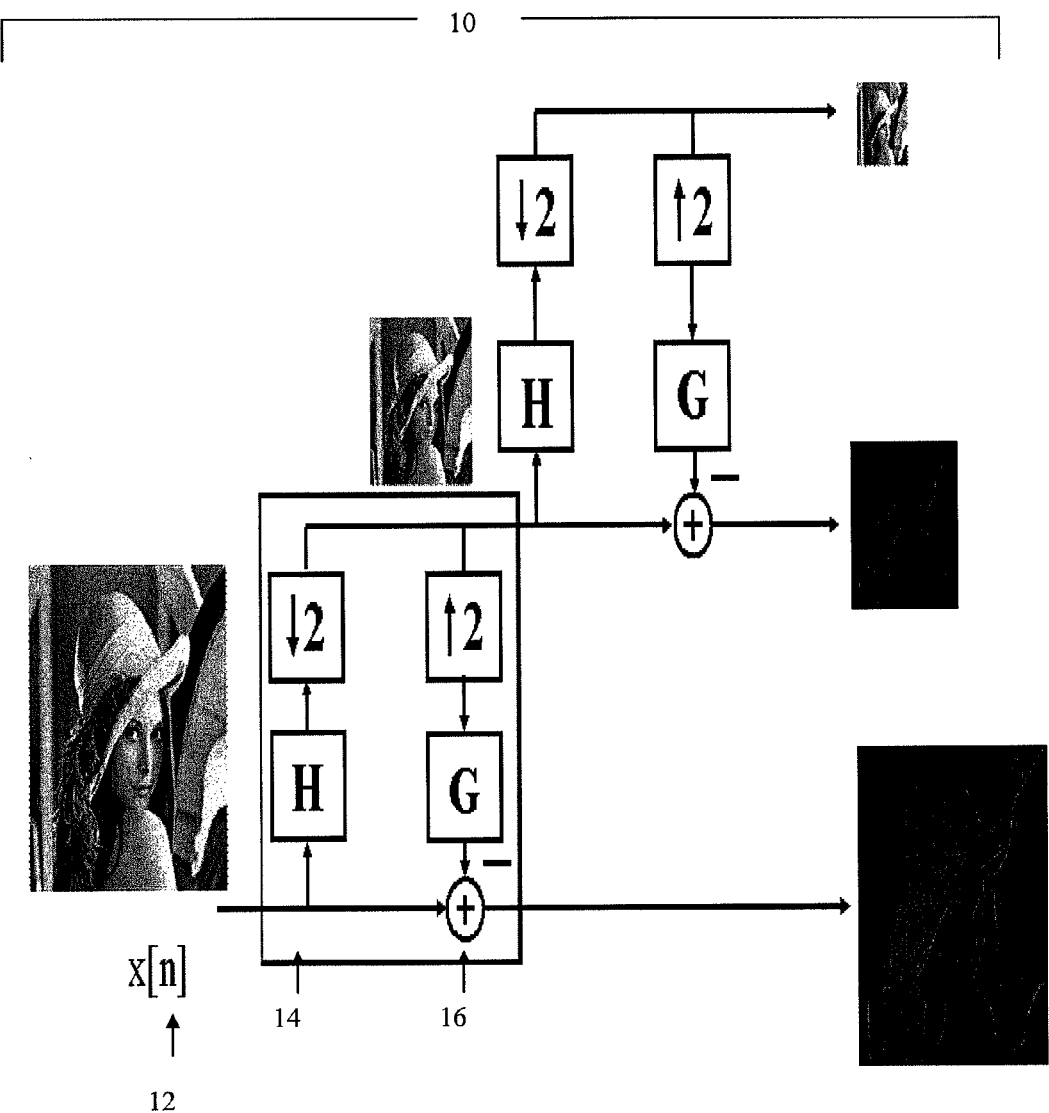
FIG. 1 is a perspective view illustrating a prior art multi-scale Laplacian Pyramid (LP) signal representation.

The invention will now be described with reference to the drawing figures, in which like reference numerals refer to like parts throughout. An embodiment in accordance with the present invention provides novel resampling filters and lifting-based techniques to significantly enhance both the conventional LP decomposition and reconstruction frameworks. The present invention embodies a complete parameterization of all synthesis reconstruction schemes, among which the conventional LP reconstruction and the frame-based prior art pyramid reconstruction scheme are but special cases.

FIG. 1 illustrates a prior art method wherein a non-linear operator is associated with each level of decomposition. This illustration depicts the conventional multi-scale Laplacian Pyramid (LP) signal representation 10 where the input signal x[n] 12 is represented as a combination of a coarse approximation and multiple levels of detail signals 14 and 16 at different resolutions. Optimal reconstruction of the input signal x[n] 12 is consistent as the reconstruction stage adds back what was subtracted during the decomposition stage.

Figure 2:
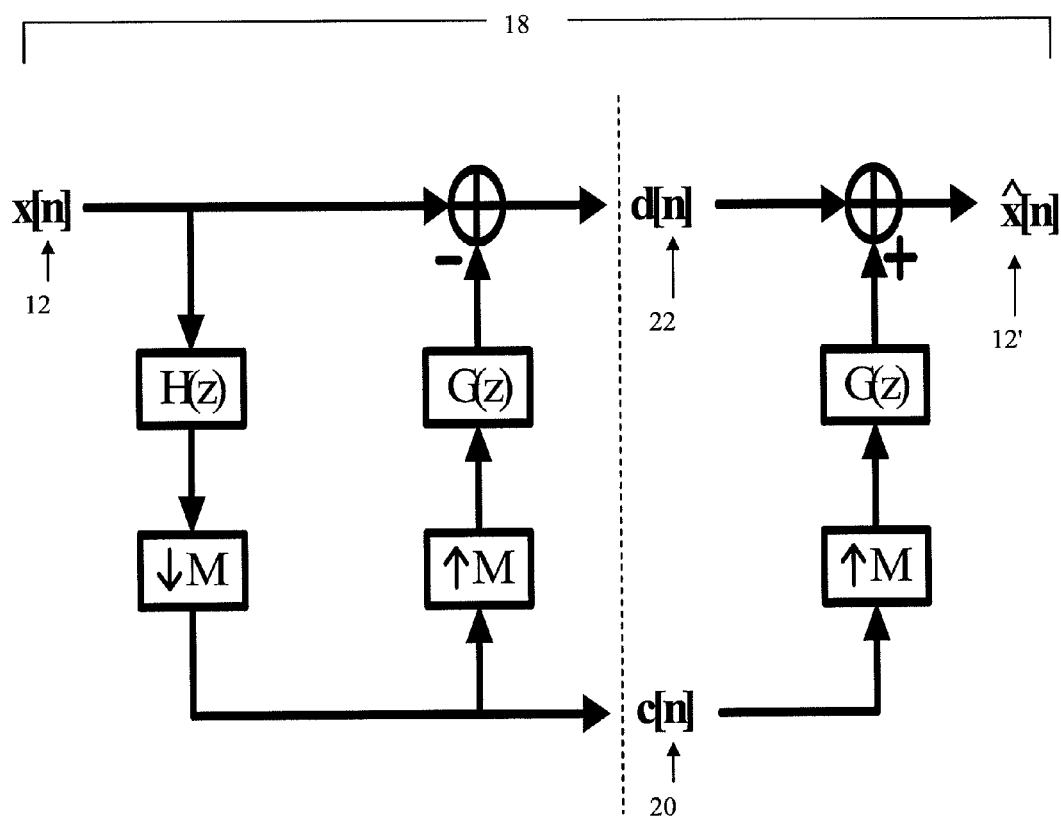
FIG. 2 is a diagrammatic representation of a basic block diagram of a prior art Laplacian Pyramid (LP) signal decomposition scheme.

FIG. 2 depicts the basic block diagram of the Laplacian Pyramid (LP) signal decomposition scheme 18. On the left is the LP analysis stage which generates the coarse approximation signal c[n] 20 and the prediction error or residue (details) signal d[n] 22. On the right is the conventional LP synthesis stage where the signal x[n] 12' is reconstructed by combining the residue with the interpolated coarse approximation.

For an LP with decimation factor M, the synthesis FB of the present invention covers all the design space, but has only M design parameters. This is in contrast to M(M+1) free entries in the generic synthesis form presented in the prior art frame pyramid by Do and Vetterli. The present invention leads to considerable simplification in the design of the optimal reconstruction stage. The dual frame reconstruction is also derived from the lifting representations set forth in the present invention. The novel reconstruction is able to control efficiently the quantization noise energy in the reconstruction, but does not require bi-orthogonal filters as they would otherwise be used in the prior frame-based pyramid reconstruction.

A special lifting-based LP reconstruction scheme is also derived from the present invention's master LP reconstruction, which allows one to choose the low-pass filters to suppress aliasing in the low resolution images efficiently. At the same time, it provides improvements over the usual LP method for reconstruction in the presence of noise. Furthermore, even in the classic LP context, the resampling filters in accordance with the present invention are optimized to offer the fewest mean squared reconstruction errors when the detail signals are missing. In other words, with only the lower-resolution coarse approximation of the signal available, the present invention's pair of decimation and interpolation filters deliver the minimum mean-squared error reconstruction while capturing the maximum energy in the coarse signal. Furthermore, all decimation and interpolation filter pairs are designed to be hardware-friendly in that they have short finite impulse responses (FIR), linear phase, and dyadic-rational coefficients.

Figure 3:
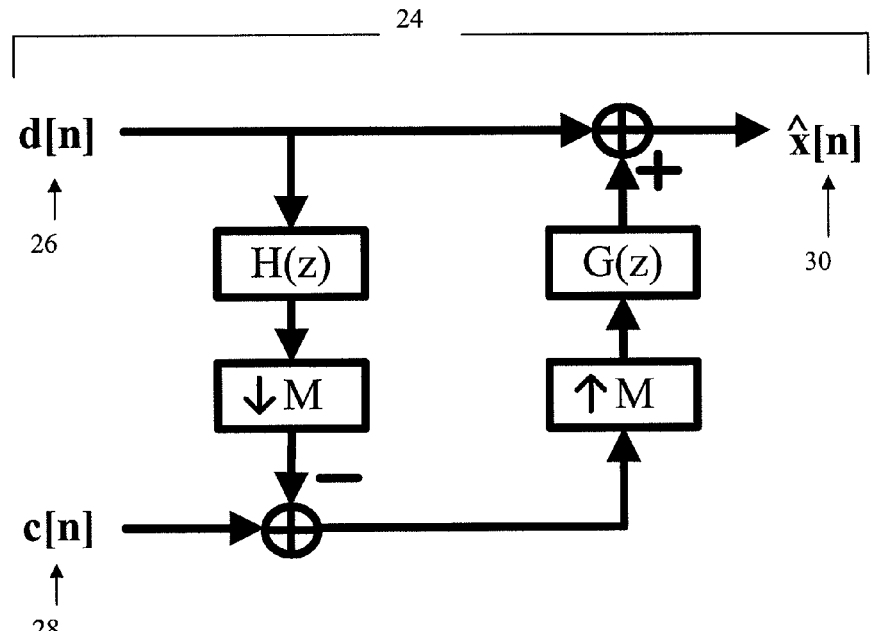
FIG. 3 depicts a prior art frame-based pyramid reconstruction scheme.

FIG. 3 depicts the frame-based pyramid reconstruction scheme 24 as described in Do and Vetterli's "Frame Pyramid." Operators H(z) and G(z) in this method must be bi-orthogonal, i.e., their inner product yields unity $$<h[n],g[n]>=1.$$

LPs are in one-to-one correspondence with pairs of up and down sampling filters. Although such "resampling" filters are well-known and commonly used, the present invention presents special up and down sampling filters and corresponding LPs which display certain optimization characteristics. Systems that employ them are designated herein as Optimal Laplace Pyramid Processing Systems (OLaPPS). For an LP to be qualified as an OLaPPS, it must exhibit two main characteristics. First, the Decimation Filter H(z) has to retain the maximum signal energy in the principal component sense. In other words, the coarse approximation c[n] in an OLaPPS contains at least as much signal energy as other approximation signals obtained from other decimation filters. Second, the Interpolation Filter G(z) yields a reconstructed signal $\hat{x}[n]$ that is optimal in the mean-squared sense. In other words, $\hat{x}[n]$ is the minimum mean-squared error reconstruction of x[n] among available reconstructions.

Figure 4:
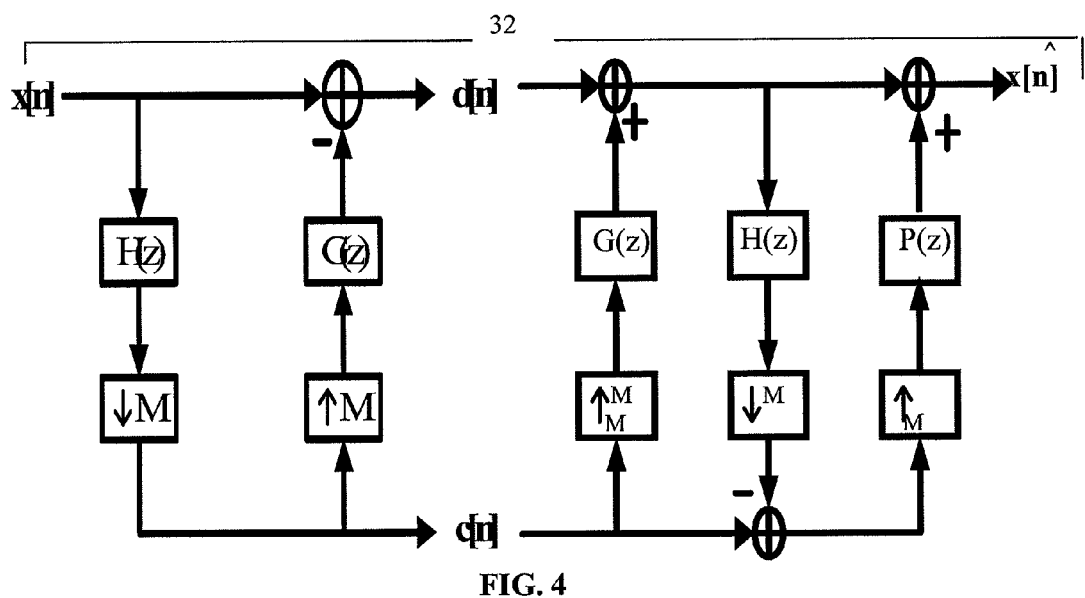
FIG. 4 illustrates a master pyramid reconstruction scheme in accordance with one embodiment of the method of the present invention.

An embodiment of the present inventive reconstruction method is illustrated in FIG. 4. FIG. 4 shows the master pyramid reconstruction scheme 32 as covered in this invention. Operators employed in the analysis pyramid stage {H(z), G(z)} do not have to satisfy the bi-orthogonal property or any other, as the reconstruction method of the present invention leads to perfect LP reconstruction for any operator P(z). This framework is a significant improvement of the conventional LP reconstruction (the first step in the reconstruction involving G(z)) and of the frame-based pyramid LP reconstruction.

The filters of this embodiment of the present invention have roots from the wavelet theory, which is well known in the art to have excellent interpolation characteristics. The novel system of the present invention ensures that if the re-sampled lower-resolution signal ever has to be interpolated back to the original high resolution, then the difference between the original high-resolution signal and the reconstruction is minimized. Moreover, the present invention demonstrates that efficiency of the re-sampling system above does not necessarily have to be sacrificed by employing short low-complexity integer-coefficient filters. One potential application is in high-definition (HD) and standard-definition (SD) video conversion where this inventive OLaPPS interpolation ensures that the video for HD display up-converted from an OLaPPS-processed SD source achieves the highest quality level in the mean-squared sense.

Figure 5:
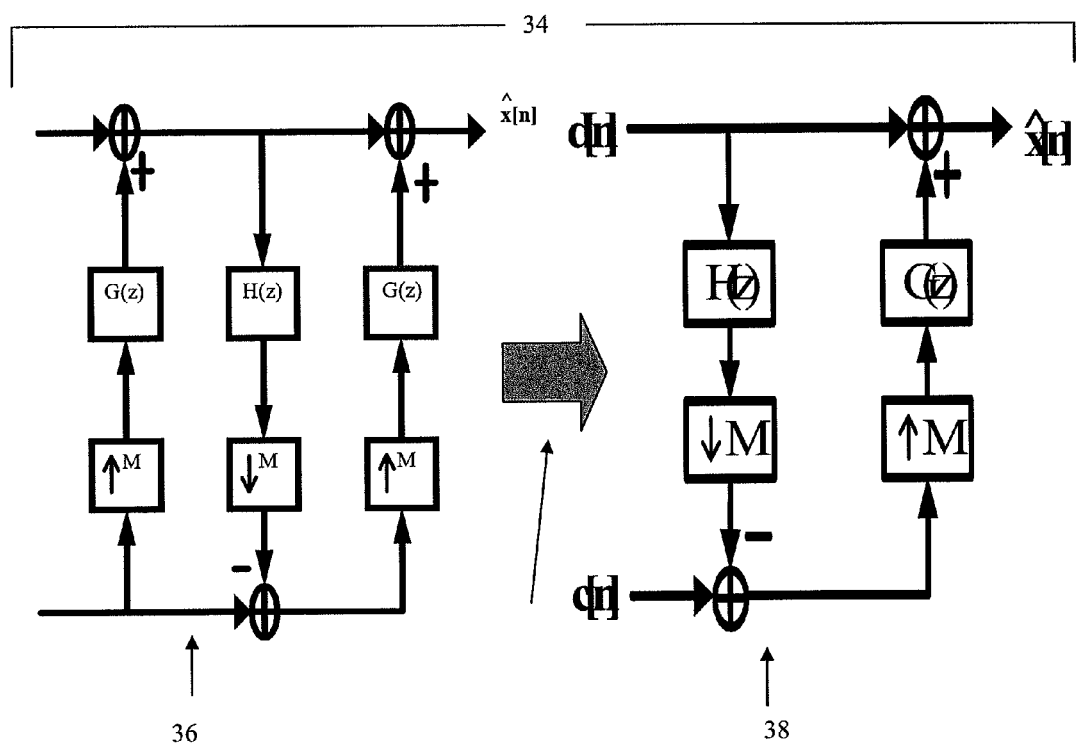
FIG. 5 illustrates the reduction properties of the reconstruction scheme of the present invention in relationship to that of the prior art.

FIG. 5 demonstrates that the frame-based pyramid reconstruction scheme 34 is just a particular solution in the master framework of the present invention: if one chooses to employ a set of bi-orthogonal filter pair {H(z), G(z)} and furthermore sets P(z)=G(z), then the reconstruction method 36 of the present invention on the left reduces down to the frame-based reconstruction method 38 on the right.

Figure 6:
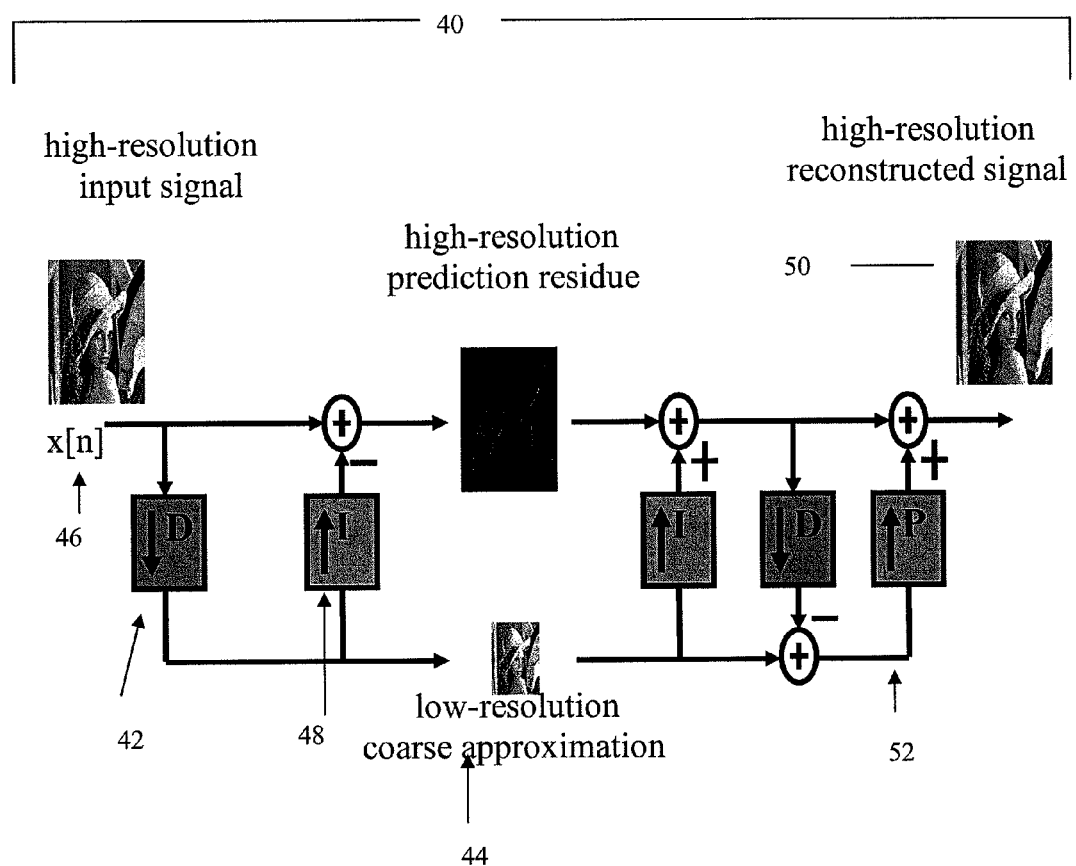
FIG. 6 depicts a master reconstruction scheme in accordance with the present invention.

FIG. 6 depicts the master pyramid reconstruction structure 40 of the present this invention. Here, D 42 can be any decimation operator (can be non-linear) which produces a coarse approximation c[n] 44 of the input signal x[n] 46 while I 48 can be any interpolation operator (can be non-linear) which attempts to construct a full-resolution signal 50 resembling x[n] from the coarse approximation c[n]. The final reconstruction step involves P 52 which can be any prediction operator (again, can be either linear or non-linear).

Figure 7:
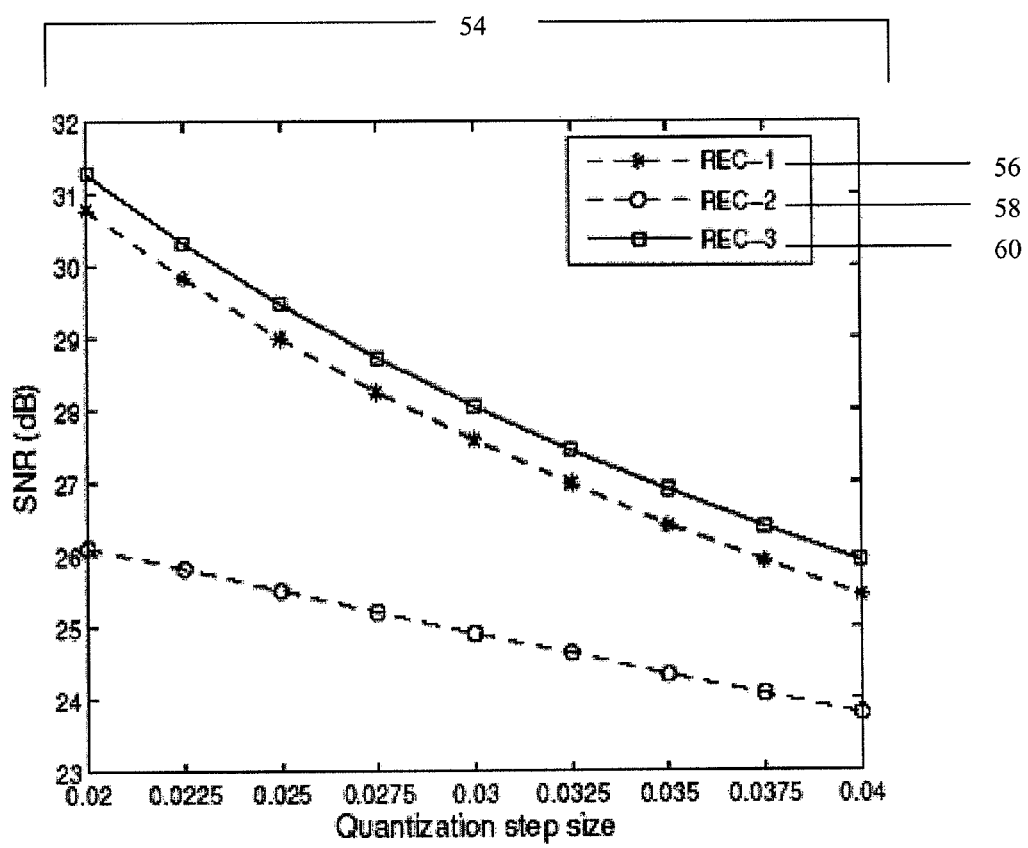
FIG. 7 shows the comparison of various reconstruction schemes from the quantized LP coefficients of the popular 512×512 Barbara test image using the reconstruction schemes of FIG. 1, FIG. 2, and that of the present invention.

FIG. 7 shows the comparison of various reconstruction schemes from the quantized LP coefficients of the popular 512×512 Barbara test image. In the graph 54 of quantization step size v. SNR, the LP is decomposed with two levels; both H(z) and G(z) filters are set as the low-pass filter employed in SVC $$h[n]=\{2,0,-4,-3,5,19,26,19,5,-3,-4,0,2\}.$$

REC-1 56 is the result from the traditional pyramid reconstruction in FIG. 1. REC-2 58 denotes the result of the prior art frame-based reconstruction scheme proposed by Do and Vetterli and shown in FIG. 2. Finally, REC-3 60 is the result from our reconstruction method where all three filters (including the arbitrary operator P(z)) are set to the filter H(z) above.

Figure 8:
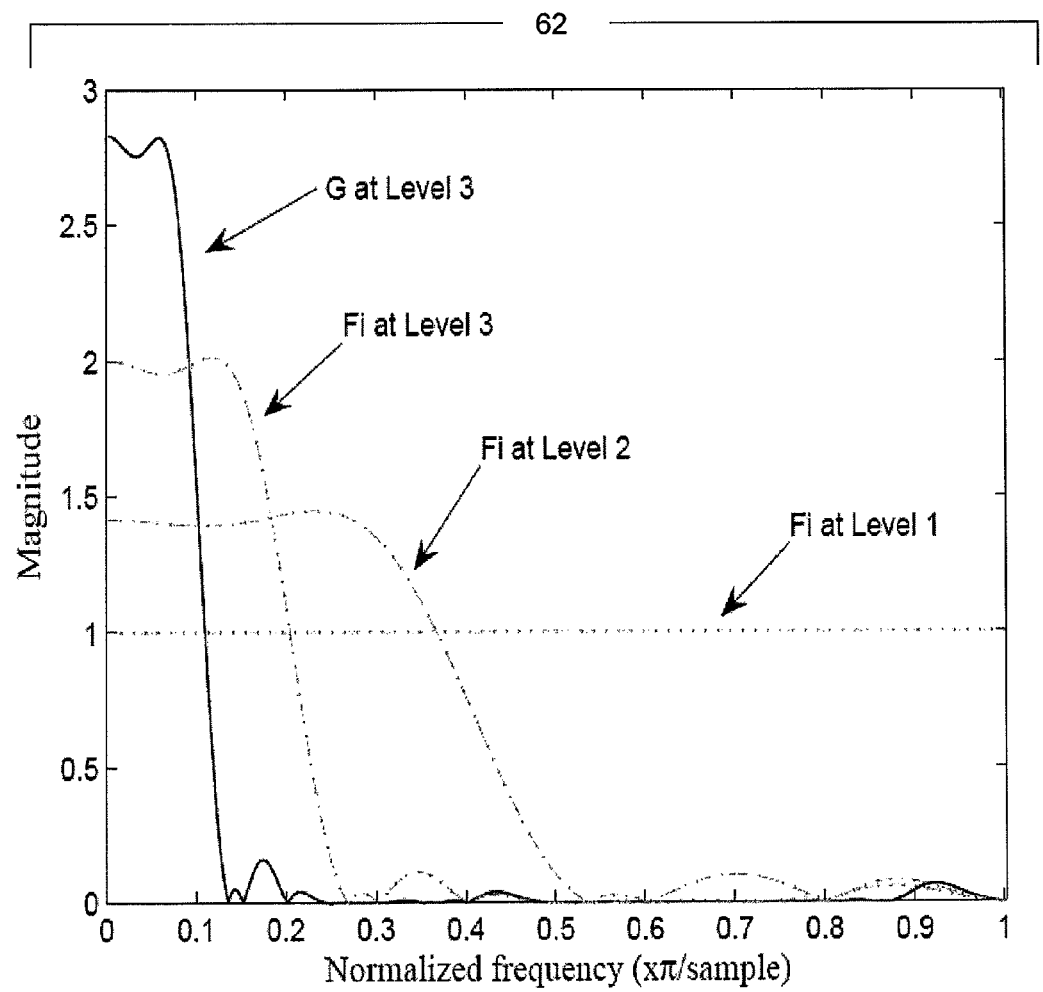
FIG. 8 illustrates the frequency responses of the equivalent iterated filters for the three-level LP representation with the low-pass filter h[n] in SVC via the conventional reconstruction method shown in FIG. 1.
Figure 9:
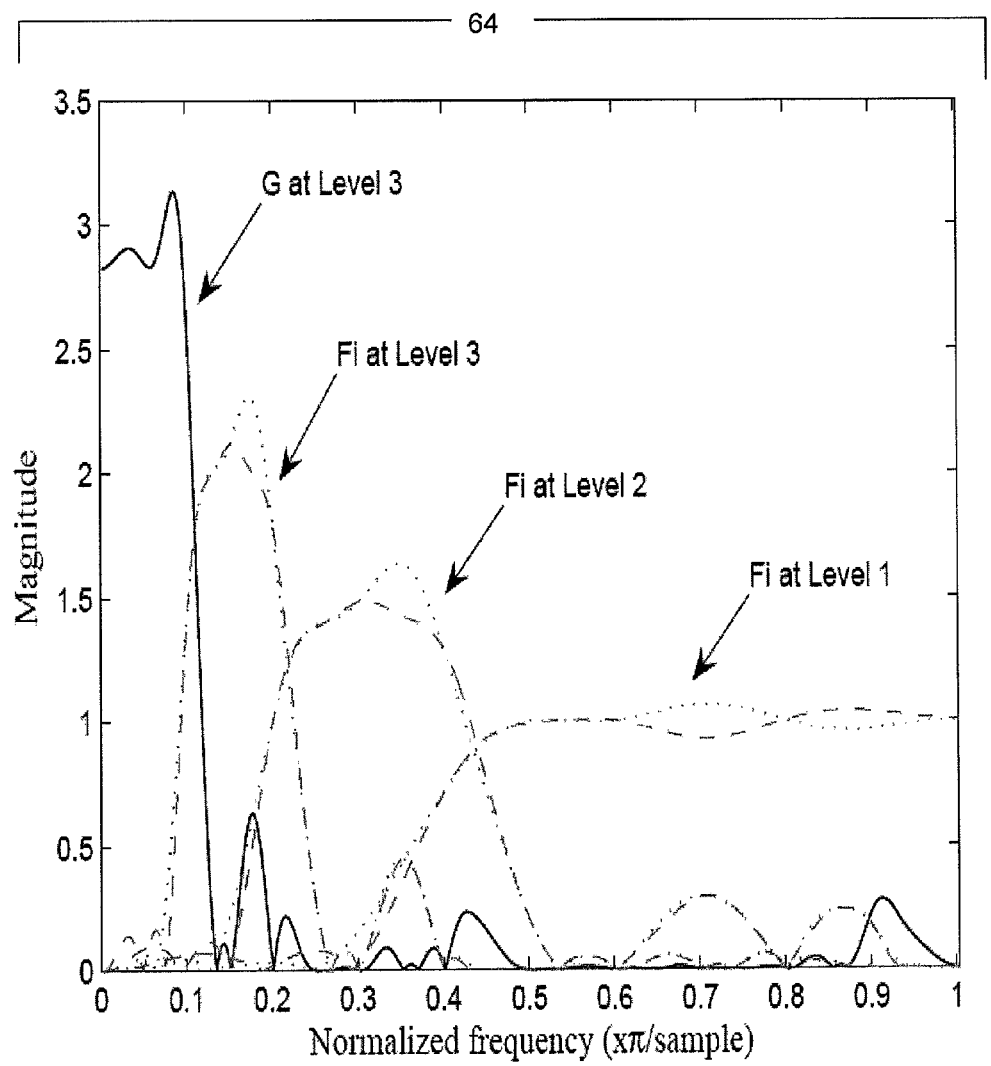
FIG. 9 depicts the frequency responses of the equivalent iterated filters for the three-level LP representation with the low-pass filter h[n] in SVC via the lifting-based reconstruction method in accordance with the present invention.

FIG. 8 illustrates the graph 62 of frequency responses of the equivalent iterated filters for the three-level LP representation with the low-pass filter h[n] in SVC [3] via the prior art reconstruction method shown in FIG. 1. It is to be noted that all synthesis filters are low-pass. FIG. 9 depicts the graph 64 of frequency responses of the equivalent iterated filters for the three-level LP representation with the low-pass filter h[n] in SVC via the proposed lifting-based reconstruction method. Here, the synthesis filters are band-pass and match with the frequency regions of corresponding sub-bands. Therefore, the new method confines the influence of noise from the LP only in these localized sub-bands.

Figure 10A:
FIG. 10A is a photographic illustration of a depiction of image de-noising involving a first pyramid reconstruction scheme, as compared with FIGS. 10B and 10C.
Figure 10B:
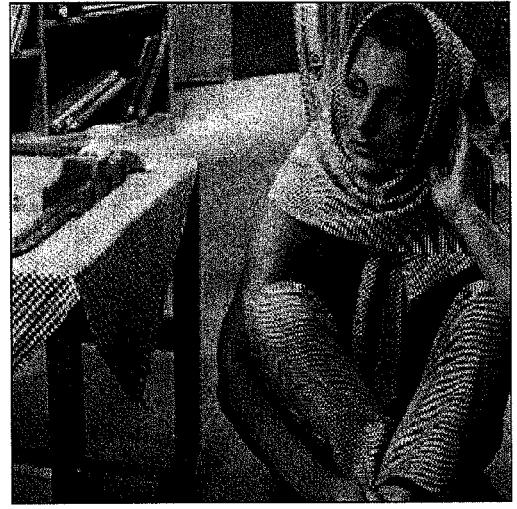
FIG. 10B is a photographic illustration of a depiction of image de-noising involving a second pyramid reconstruction scheme, as compared with FIGS. 10A and 10C.
Figure 10C:
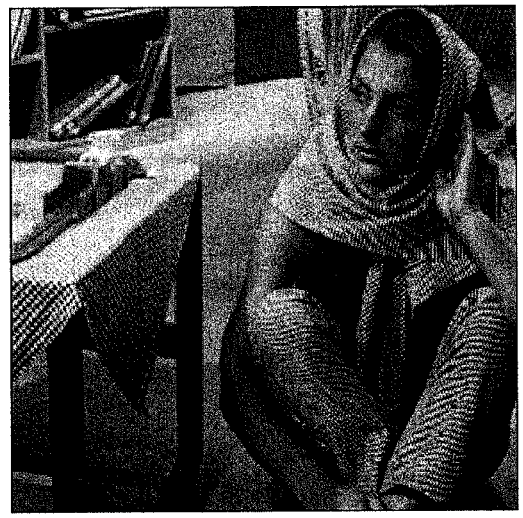
FIG. 10C is a photographic illustration of a depiction of image de-noising involving a third pyramid reconstruction scheme, as compared with FIGS. 10A and 10B.

FIGS. 10A-10C illustrate a comparison in image de-noising involving three pyramid reconstruction schemes. The Barbara test image is corrupted with uniform independent identically distributed (i.i.d.) noise introduced to 6-level decomposition LP coefficients with 13-tap low-pass filter in SVC. Conventional REC-1 reconstruction: SNR (signal-to-noise ratio)=6.25 dB; Framed-based REC-2 reconstruction: SNR=14.17 dB; the general REC-3 reconstruction in this invention: SNR=17.20 dB. This is a dramatic enhancement of the image reconstruction.

Figure 11A:
FIG. 11A is a photograph of a portion of the reconstructed Barbara test image with severe aliasing effects using prior art filters.
Figure 11B:
FIG. 11B is a photograph of a portion of a visually-pleasant aliasing-free reconstructed Barbara test image in accordance with the 13-tap SVC low-pass filter implemented in the present invention.

FIGS. 11A and 11B demonstrates visually the importance of low-pass filter design in our reconstruction approach. On the left is a portion of the reconstructed Barbara test image with severe aliasing effects where the two operators H(z) and G(z) are chosen as the famous Daubechies 9/7-tap bi-orthogonal wavelet filters (JPEG2000 default filter pair) respectively. On the right is a portion of the visually-pleasant aliasing-free reconstructed Barbara test image where the three operators H(z), G(z), and also P(z) are all set to the 13-tap SVC low-pass filter [3].

Down-Sampling Odd-Length Filter Design

Instead of optimizing the low-pass filter so that its frequency response has steep transition characteristics to match the ideal low-pass box filter, implementation of the present invention calls for a smoother, slower-decaying frequency response. Filters that allow a little aliasing (to capture a bit more image information) outperform filters with good anti-aliasing characteristics; accordingly good wavelet filters tend to perform well here. Therefore, three solution-based aspects of this embodiment of the present invention are set forth herein:

h5=[−1 2 6 2 −1]/8: 5-tap dyadic-coefficient filter as used by JPEG2000.

h9=[1 −1 −3 9 20 9 −3 −1 1]/32: 9-tap dyadic-coefficient filter, an improvement of the default 9-tap irrational-coefficient Daubechies wavelet filter in JPEG2000;

h11=[1 0 −3 0 10 16 10 0 −3 0 1]/32: 11-tap dyadic-coefficient half-band filter designed to minimize aliasing effects in sub-sampled images.

Figure 12:
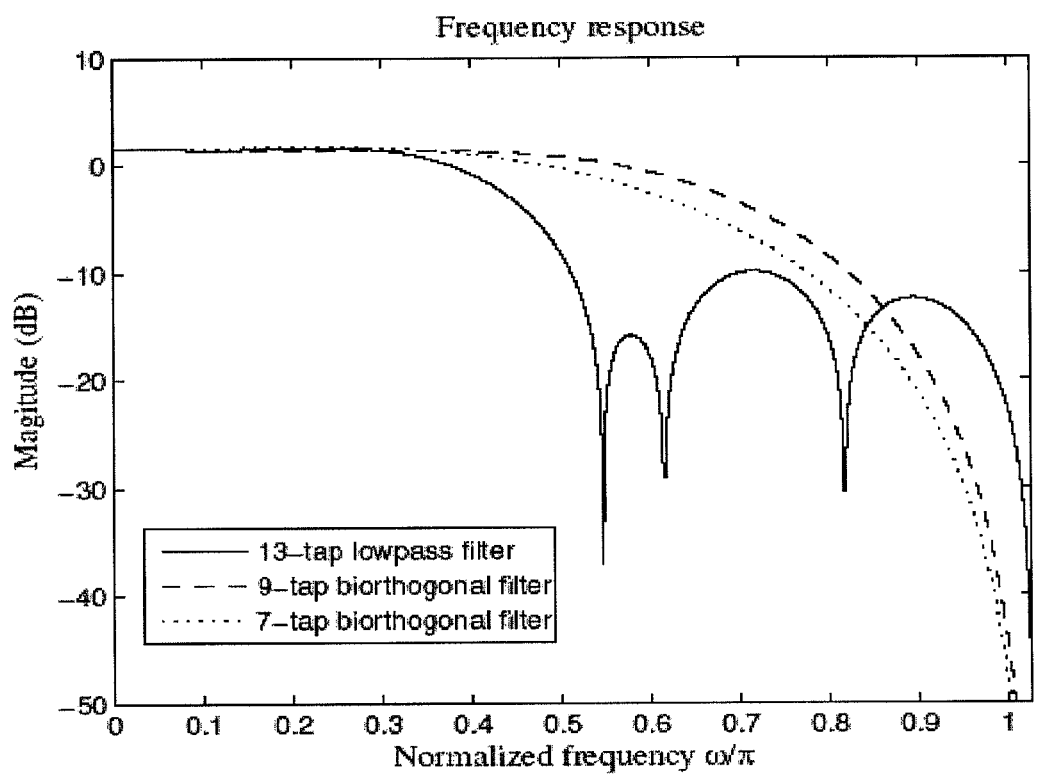
FIG. 12 is a detail view of a comparison of the frequency responses of the 9-tap, 7-tap, and 13-tap low-pass filters used in accordance with the present invention.
Figure 13:
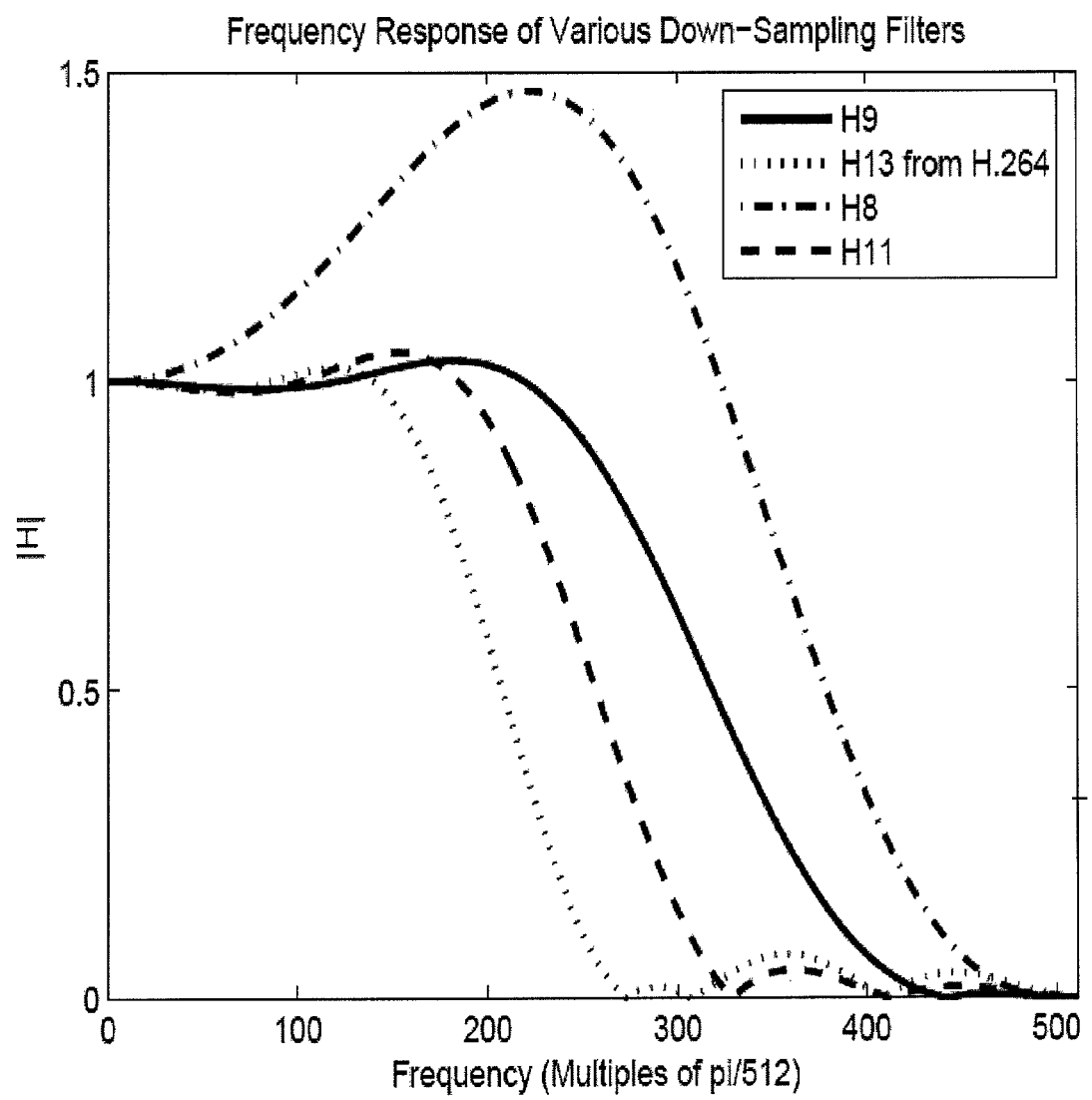
FIG. 13 shows the frequency responses of a plurality of down-sampling low-pass filters in accordance with the present invention.

FIG. 12 compares the frequency responses of the 9-tap, 7-tap, and 13-tap low-pass filters used for demonstration frequently in the description. FIG. 13 shows the frequency responses of several of the down-sampling low-pass filters. FIG. 15 presents a table of dyadic-rational coefficients or elements of decimation filters.

Down-Sampling Even-Length Filter Design

Following a similar design philosophy as with the odd-length filters in the previous section, the down-sampling even length filter design of the present invention presents maxflat half band filters and performs spectral factorization to obtain even-length filter pairs for down- and up-sampling. This design procedure ensures that each filter pair forms a pair of bi-orthogonal partners, minimizing the mean-square error of the reconstruction signal. Accordingly, two solution-based aspects of this embodiment of the present invention are set forth herein:

h4=[−1 3 3 −1]/4: 4-tap dyadic-coefficient filter;

h8=[3 −9 −7 45 45 −7 −9 3]/64: 8-tap dyadic-coefficient filter.

The frequency responses of several of the proposed filters, even-length as well as odd-length, are depicted in FIG. 13 along with the previous H.264 low-pass filter's response. Besides FIR and integer coefficients, all of the filters have linear phase, a critical requirement for imaging applications and fast implementation. All of the decimation filters are tabulated in FIG. 15.

Up-Sampling Filter Design

Filters with good anti-aliasing characteristics and smooth frequency responses (a characteristic of maximally-flat or maxflat filters for short [9, 10, 13]) perform well in up-sampling. The prior art 11-tap filter in H.264 SVC has both of these properties. The present invention provides another 7-tap candidate with similar characteristics and performance level, yet requiring a much lower computational complexity: f7= [−1 0 9 16 9 0 −1]/16. The odd-length filter pair of h9/f7 is designed from approximations of wavelet's famous 9/7 Daubechies filters used as the default choice in JPEG2000, which in turn are obtained from spectral factorization of the maxflat half-band filter p15=[−5 0 49 0 −245 0 1225 2048 1225 0 −245 0 49 0 −5]/2048.

For the shorter even-length pairs of h4/f4 and h8/f4, we start with the following two shorter maxflat half-band filters:

p7=[−1 0 9 16 9 0 −1]/16 p11=[3 0 −25 0 150 256 150 0 −25 0 3]/256.

Figure 14:
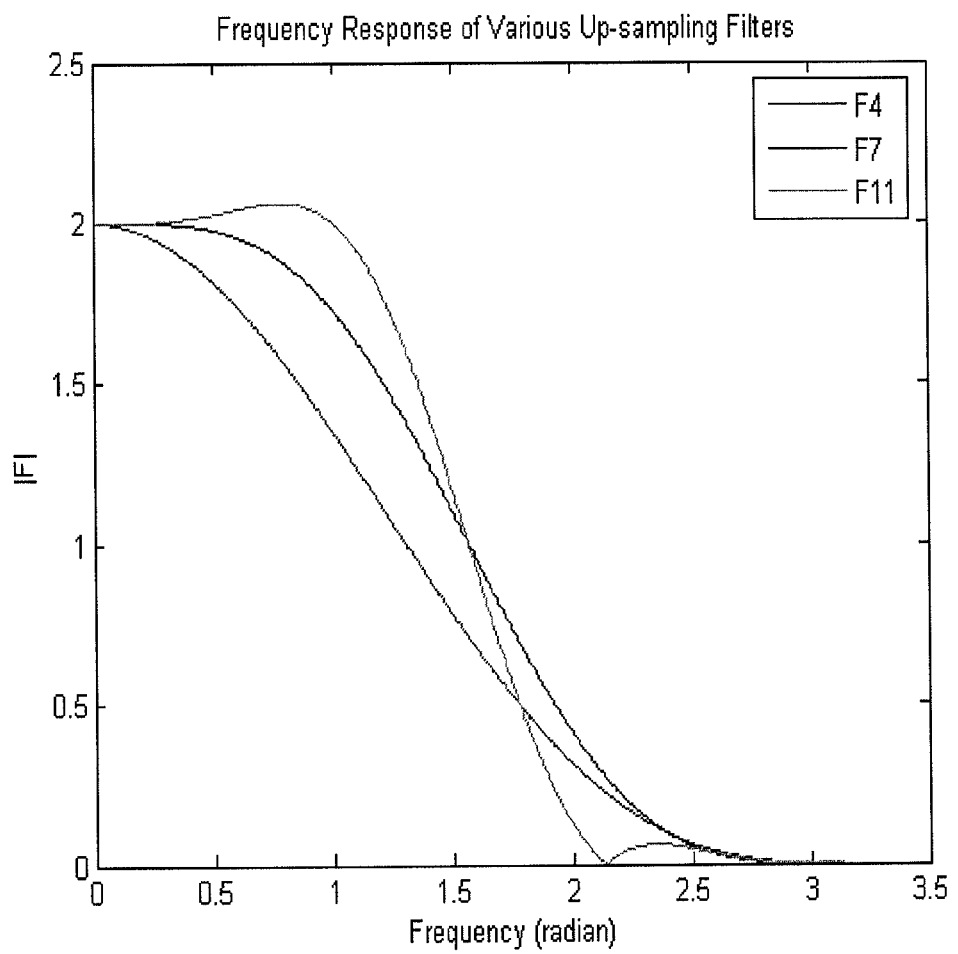
FIG. 14 shows the frequency responses of a plurality of up-sampling low-pass filters in accordance with the present invention.

The even-length anti-imaging up-sampling filter is chosen as f4=[1 3 3 1]/4 and the remaining roots of p7 and p11 are allocated to h4 and h8 respectively. The frequency responses of all up-sampling filters as well as of the previous 11-tap H.264 filter are shown in FIG. 14. The solutions of the present invention sacrifice sharp frequency transition for a higher degree of smoothness/regularity. This is a desirable characteristic for smooth interpolation. All of the FIR linear-phase integer-coefficient interpolation filters of the present invention are tabulated in FIG. 16.

Laplacian Pyramids as Oversampled Filter Banks

The prior art LP decomposition and its usual reconstruction can be illustrated in FIG. 2, where H(z) and G(z) are the decimation and interpolation filters, respectively. In the LP decomposition, the coarse approximation c[n] of an input signal x[n] is generated through the H(z) filtering stage followed by down-sampling. Then, c[n] is up-sampled and filtered to provide a prediction signal whose difference from the original signal x[n] is called the prediction error signal d[n]; this typically contains high-frequency finer details of x[n]. In the conventional LP reconstruction, the reconstruction signal x̂[n] is obtained by simply adding d[n] back to the interpolation of c[n]. Since c[n] and d[n] have more coefficients than x[n], the LP is an over-complete system, often called a frame or an over-sampled filter bank in the literature.

The LP realizes a frame expansion, as x[n] can be always reconstructed from c[n] and d[n]. From the Filter Bank (FB) point of view, the LP can be formulated as an (M+1)-channel over-sampled FB with a sampling factor M [4]. Let the superscript letter H denote the Hermitian transpose, then the polyphase analysis matrix for the LP decomposition in FIG. 2 can always be written as $$E(z) = \begin{bmatrix} h(z) \\ I_M - g^H(z)h(z) \end{bmatrix} \quad (1)$$

where the 1×M vectors h(z) and g(z) are Type-I polyphase matrices of H(z) and G(z), respectively [13]. The corresponding polyphase synthesis matrix is $$R(z) = [g^H(z) \ I_M] \quad (2)$$

It can be easily shown that perfect reconstruction is always achieved in the absence of noise regardless of the selection of H(z) and G(z), since the cascade of the analysis followed by the synthesis polyphase matrices is always the identity matrix, i.e., R(z) E(z)=I.

As illustrated in FIG. 3, the prior art frame-based LP reconstruction scheme of Do and Vetterli has the polyphase synthesis matrix as $$R(z) = [g^H(z) \ I_M - g^H(z)h(z)] \quad (3)$$

The PR condition is satisfied only when H(z) and G(z) are bi-orthogonal filters, and the reconstruction above leads to an improvement over the traditional reconstruction when H(z) and G(z) are orthogonal or near orthogonal filters. Under this restriction, E(z) is a paraunitary matrix.

Lifting-based constructions are utilized extensively in U.S. Pat. No. 6,421,464, "Fast Lapped Image Transforms Using Lifting Steps," by the inventors of the present invention. For example, in the elementary two-dimensional case, a lifting step corresponds to a 2×2 matrix that is the identity plus one non-diagonal entry, and whose inverse is the same matrix, but the non-diagonal entry has the opposite sign. Lifting steps are ideal for constructing and implementing highly optimized signal transforms. They are used here for optimized integer-based resampling filters and associated LPs.

A second embodiment of the present invention pertains to enhanced reconstruction methods, applicable even when the resampling filters are fixed. For any given LP filters H(z) and G(z), the PR condition can be always satisfied, since by construction the error signal is incorporated into the scheme. In the prior art scheme of Do and Vetterli, a general complete parameterization of all PR synthesis FBs is formulated as $$R(z) = \tilde{R}(z) + U(z)[I_{M+1} - E(z)\tilde{R}(z)] \quad (4)$$

where $\tilde{R}(z)$ can be any particular left inverse of E(z), and U(z) is an M×(M+1) matrix with bounded entries. The reconstruction scheme resulting from equation (4) thus has M(M+1) degrees of design freedom. In this second embodiment of the present invention, the number of free parameters can be further reduced based on the following lifting-based parameterization.

For any LP filters, the polyphase matrix in Eq. (1) can always be factorized into two lifting steps as follows $$E(z) = \begin{bmatrix} h(z) \\ I_M - g^H(z)h(z) \end{bmatrix} = \begin{bmatrix} 1 & 0 \\ -g^H(z) & I_M \end{bmatrix} \begin{bmatrix} 1 & h(z) \\ 0 & I_M \end{bmatrix} \begin{bmatrix} 0 \\ I_M \end{bmatrix} \quad (5)$$

To invert a lifting step, one can subtract out what was added in at the forward transform. Thus, the left inverse of E(z) is achieved by inverting the lifting steps in Eq. (5). This provides the master form of R(z).

For any given conventional LP analysis (decomposition) stage, its synthesis polyphase matrix R(z) has the following master lifting-based representation, is hereby designated as an Enhanced Reconstruction Laplace Pyramid (ERLaP):

$$R(z) = [0 \ I_M] \begin{bmatrix} 1 & 0 \\ p^H(z) & I_M \end{bmatrix} \begin{bmatrix} 1 & -h(z) \\ 0 & I_M \end{bmatrix} \begin{bmatrix} 1 & 0 \\ g^H(z) & I_M \end{bmatrix} \quad (6)$$

where p(z) is any arbitrary 1×M vector with bounded entries. The first two terms in the matrix product in Eq. (5) are lower-triangular and upper-triangular square matrices, so it is easy to see that their corresponding inverses are similar triangular matrices with inverting polarity as in the last two terms in the matrix product of Eq. (6). What remains is to obtain the left inverse for the (M+1)×M matrix $$\begin{bmatrix} 0 \\ I_M \end{bmatrix}$$

which has a row of M zeros on top of an identity matrix. The most general left inverse of this matrix is $[p^H(z) \ I_M]$ where p(z) is an arbitrary polynomial vector taking the form described above and the superscript H indicates the conjugate transpose operator since $$[p^H(z) \ I_M] \begin{bmatrix} 0 \\ I_M \end{bmatrix} = I_M.$$

Finally, the matrix $[p^H(z) \ I_M]$ can always be factorized into the following product $$[0 \ I_M] \begin{bmatrix} 1 & 0 \\ p^H(z) & I_M \end{bmatrix}$$

as shown in the first two terms of Eq. (6).

Let p(z) be the type-I polyphase vector of a filter P(z). Then, the reconstruction matrix in Eq. (6) is equivalent to the master reconstruction scheme of the first embodiment of the present invention shown in FIG. 4. For any given LP decomposition, Eq. (6) only has M degrees of design freedom. Despite the reduced number of free parameters, Eq. (6) covers the complete space of all synthesis filter banks. It is to be noted that the operator P(z) is independent of the decimation filter H(z) and the interpolation filter G(z). How to optimize P(z) for any given pair of H(z) and G(z) is the topic of interest in the next section. From Eq. (6) and the equivalent representation in FIG. 4, given that the first reconstruction stage involving G(z) incorporates the conventional pyramidal reconstruction, the second embodiment of the present invention groups the two stages involving H(z) and G(z) into a combined operator called the Enhanced Reconstruction stage. The conventional pyramidal reconstruction stage and the Enhanced Reconstruction stage forms an ERLaP as first described in Eq. (6).

Dual-Frame LP Reconstruction Scheme and Optimal Design

For any filters H(z) and G(z), the reconstruction synthesis matrix as shown in Eq. (6) can have certain desired properties by optimizing p(z). In order to choose p(z) such that Eq. (6) minimizes the reconstruction error when white noise is introduced into LP coefficients, the optimization solution presented herein is to find the dual frame reconstruction solution. Through error analysis of the LP system, a close-form solution of dual frame reconstruction is presented below.

For the LP with polyphase analysis matrix E(z) given in Eq. (1), its dual frame reconstruction can be expressed as $$E^+(z) = [\, p_{opt}^H(z) \quad I_M \,] \begin{bmatrix} 1 - h(z)g^H(z) & -h(z) \\ g^H(z) & I_M \end{bmatrix} \quad (7)$$

where $$p(z) = \frac{h(z) - d(z)g(z)}{d(z)d^H(z) + h(z)h^H(z)} \quad (8)$$

and $$d(z) = 1 - h(z)g^H(z). \quad (9)$$

It is to be noted that once given FIR filters H(z) and G(z), the dual frame solution above corresponds to a FB with infinite-impulse response (IIR) filters. If $L(z) = d(z)d^H(z) + h(z)h^H(z)$ is a positive constant, then the dual-frame solution is a FB with FIR filters. Otherwise, L(z) is approximated by a constant to realize an FIR implementation.

Considering the dual frame reconstruction in Eq. (7) that normally involves IIR filters and hence is undesirable in practical applications, a second aspect of the second embodiment of the present invention of the master lifting-based LP reconstruction in Eq. (6) and let p(z)=g(z). This special LP reconstruction then leads to the LP reconstruction scheme depicted in FIG. 5. Recall that when H(z) and G(z) are not bi-orthogonal filters, the prior art frame-based pyramid reconstruction of Do and Vetterli does not satisfy the PR condition. Thus, its performance would suffer. However, the LP reconstruction of the present invention always satisfies the PR condition regardless of filter choices, and it can still maintain good performance when H(z) and G(z) are reasonable low-pass filters. As an illustration, let REC-1 denote the usual reconstruction shown in FIG. 2, REC-2 denote the prior art frame-based pyramid reconstruction of Do and Vetterli depicted in FIG. 3, and REC-3 denote the special lifting reconstruction illustrated in FIG. 5. The performance of these three LP reconstruction schemes is compared when H(z) and G(z) are the same low-pass filter in SVC whose coefficients are tabulated in FIG. 17 and when M=2. FIG. 17 presents a 13-tap low-pass filter in SVC and its coefficients.

First, an image coding application is used wherein uniform scalar quantization with equal step size is applied for all LP coefficients (in an open-loop mode). FIG. 7 shows the SNR result for the popular Barbara test image of size 512×512. It demonstrates that REC-3 has 0.5 dB gain over REC-1, while REC-2 is around 2.5 dB worse than REC-1. Secondly, a prior art de-noising application is used wherein the LP coefficients are usually thresholded so that only the m most significant coefficients are retained. FIG. 18 lists the numerical de-noising results for three standard test images. REC-3 consistently yields better performances by around 0.4 dB in SNR than REC-1 while REC-2 has worse performance than REC-1 since the PR property is not satisfied. It is to be noted that when the LP filters are bi-orthogonal, e.g., 9/7 bi-orthogonal wavelet filters, REC-3 has exactly the same performance as REC-2, which can provide better performance than REC-1 by around 0.5 dB in SNR as presented in the prior art. However, bi-orthogonal filters could introduce annoying aliasing components into low-resolution LP subbands, especially in image texture and/or edges regions, while the low-pass filter can generate more pleasing visual quality.

The multilevel representation is achieved when the LP scheme is iterated on the coarse signal c[n]. For the prior art LP reconstruction in FIG. 2, FIG. 8 shows an example of frequency responses of the equivalent filters when the LP filters are the low-pass filter from FIG. 17. It depicts that the synthesis filters from the conventional LP reconstruction scheme are either low-pass or all-pass filters. On the other hand, FIG. 9 illustrates the frequency responses of the equivalent filters of the second embodiment of the present invention's master reconstruction scheme in FIG. 5. It can be observed that the filters here are now band-pass and match with the frequency response regions of corresponding sub-bands. Thus, the inventive REC-3 reconstruction scheme can confine the errors from high-pass sub-bands of a multi-level LP decomposition.

This leads to better performance than REC-1 in coding applications. It also has the prominent advantage over REC-1 when the errors in the LP coefficients have non-zero mean. In such case, with the REC-1 reconstruction, the nonzero mean propagates through all low-pass synthesis filters and appears in the reconstructed signal. On the contrary, with REC-3 reconstruction, the nonzero mean is cancelled by the band-pass filters. Herein, the same examples are used as presented in the prior art: the errors in the LP coefficients (6 levels of LP decomposition) are uniformly distributed in [0, 0.1]. The SNR values for three reconstruction schemes REC-1, REC-2, and REC-3 are 6.25 dB, 14.17 dB and 17.20 dB, respectively. Although the synthesis functions of REC-3 have similar frequency responses to those of REC-2, the inventive reconstruction scheme of the present invention has better noise elimination performance because REC-2 does not satisfy the PR condition for the given low-pass filter.

Although an example of the system is shown relative to image and video data, it will be appreciated that the system may also be applied to the processing of uni- and multi-dimensional discrete signals such as audio, radar, sonar, natural images, photographs, drawings, multi-spectral images, volumetric medical image data sets, and video sequences, etc, at multiple resolutions that are captured directly in digital format or after they have been converted to or expressed in digital format.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer system with an optimal Laplacian pyramid processing system (OLaPPS), comprising:
   a computer configured to store and manipulate uni- and multi-dimensional discrete digital signals; and
   a decimation filter component of a Laplacian pyramid processing system associated with said computer for processing digital signal elements selected from a set of dimensions from one or more of the uni- and multi-dimensional discrete digital signals, the decimation filter component having a high-resolution signal as an input and a decimation signal as an output; and
   an interpolation filter component of a Laplacian pyramid processing system associated with said computer for processing digital signal elements selected from a set of dimensions from one or more of the uni- and multi-dimensional discrete digital signals, the interpolation filter component having the decimation signal as an input and a reconstructed signal as an output,
   wherein the decimation signal retains maximum energy and the reconstructed signal has minimum mean square error relative to the original high resolution signal.

2. The system of claim 1, wherein filter elements of the decimation filter component are rational approximations of optimal filter elements.

3. The system of claim 1, wherein filter elements of the interpolation filter component are rational approximations of optimal filter elements.

4. The system of claim 1, wherein the filter elements of the decimation and interpolation filter components are dyadic rational approximations of optimal filter elements.

5. A computer system with an enhanced reconstruction stage in an optimal Laplacian pyramid processing system (OLaPPS), comprising:
   a computer configured to store and manipulate uni- and multi-dimensional discrete digital signals; and
   a Laplacian pyramid processing system associated with said computer for processing a plurality of digital signal elements selected from one or more of the uni- and multi-dimensional discrete digital signals, the processing system comprising:
   a Laplacian pyramid decomposition stage, including
      a first decimation having a signal as an input and a coarse approximation of the signal as an output, and
      interpolation having the coarse approximation as an input and whose output is subtracted from the signal to result in a detail signal;
   an intermediate stage;
   a Laplacian pyramid reconstruction stage, including having the coarse approximation and detail signal as inputs, and a reconstructed signal as an output; and
   an enhanced reconstruction stage having the coarse approximation and reconstructed signal as inputs, wherein a second decimation is applied to the reconstructed signal, the output of said second decimation is subtracted from the coarse approximation to result in an intermediary signal to which a prediction is applied to result in an enhanced reconstructed signal as output.

6. The system of claim 5, wherein the first and second decimation filter elements are rational.

7. The system of claim 5, wherein the interpolation filter elements are rational.

8. The system of claim 5, wherein the first and second decimation filter elements are dyadic rational.

9. The system of claim 5, wherein the interpolation filter elements are dyadic rational.

10. The system of claim 5, wherein the first decimation filter retains maximum energy in the coarse approximation signal.

11. The system of claim 5, wherein the interpolation filter is such that the reconstructed signal is a minimum mean square error approximation of the original signal.

12. The system of claim 5, wherein the first and second decimation filter and interpolation filter elements are rational approximations of optimal filter elements.

13. The system of claim 1 wherein the first or second decimation filter is a 13-tap low pass filter.

14. The system of claim 5 wherein the interpolation filter has a filter length selected from one of the group of 3, 4, 5, 6, 7, 8, 10, and 11.

15. A system of claim 1, wherein the first or second interpolation filter has a filter length selected from one of the group of 3, 4, 5, 6, 7, 8, 10, and 11.

16. A system of claim 1, wherein the first or second decimation filter has a filter length selected from one of the group of 4, 5, 6, 8, 9, 10, 11, and 17.

17. A system of claim 5, wherein the first or second decimation filter has a filter length selected from one of the group of 4, 5, 6, 8, 9, 10, 11, and 17.

18. The system of claim 5 wherein the first or second decimation filter is a 13-tap low pass filter.

19. The system of claim 18, wherein the first and second decimation filters are close approximations.

20. The system of claim 16, wherein the first and second decimation filters are close approximations.

21. The system of claim 17, wherein the first and second decimation filters are close approximations.

22. The system of claim 15, wherein the first and second interpolation filters are close approximations.

23. The system of claim 14, wherein the interpolation filters are close approximations.

24. The system of claim 5, wherein operators of the first and second decimation may be arbitrary.

25. The system of claim 5, wherein operators of the interpolation may be arbitrary.

26. The system of claim 5, wherein operators of the enhanced reconstruction stage may be arbitrary.

27. A computer system with one of two components of an optimal Laplacian pyramid processing system (OLaPPS), comprising:
   a computer configured to store and manipulate uni- and multi-dimensional discrete digital signals; and
   a decimation filter component of a Laplacian pyramid processing system associated with said computer for processing digital signal elements selected from a set of dimensions from one or more of the uni- and multi-dimensional discrete digital signals, the decimation filter component having a high-resolution signal as an input and a decimation signal as an output,
   wherein the decimation signal retains maximum energy.

28. A computer system with one of two components of an optimal Laplacian pyramid processing system (OLaPPS), comprising:
- a computer configured to store and manipulate uni- and multi-dimensional discrete digital signals; and
- an interpolation filter component of a Laplacian pyramid processing system associated with said computer for processing digital signal elements selected from a set of dimensions from one or more of the uni- and multi-dimensional discrete digital signals, the interpolation filter component having a coarse approximation signal as an input and a reconstructed signal as an output,
- wherein the reconstructed signal has minimum mean square error relative to an original high resolution signal represented by the coarse approximation signal.

29. A computer system with an optimal Laplacian pyramid processing system (OLaPPS), comprising:
- a computer configured to store and manipulate uni- and multi-dimensional discrete digital signals; and
- a Laplacian pyramid processing system associated with said computer for processing digital signal elements selected from a set of dimensions from one or more of the uni- and multi-dimensional discrete digital signals, the processing system comprising:
  - a Laplacian pyramid decomposition stage, including
    - a first decimation having a signal as an input and a coarse approximation of the signal as an output, and
    - a first interpolation having the coarse approximation as an input and whose output is subtracted from the signal to result in a detail signal;
  - an intermediate stage; and
  - a Laplacian pyramid reconstruction stage, including
    - a second interpolation having the coarse approximation as an input and whose output is summed with the detail signal to result in a first reconstruction stage signal;
    - a second decimation having the first reconstruction stage signal as an input and whose output is subtracted from the coarse approximation to result in a second reconstruction stage signal; and
    - a prediction having the second reconstruction stage signal as an input and whose output is summed with the first reconstruction stage signal to result in a reconstructed signal as an output,
  - wherein the first decimation retains maximum energy in the coarse approximation and the reconstructed signal is simultaneously a minimum mean square error approximation of the original signal.

30. The system of claim 29, wherein filter elements of the first and second decimations are rational approximations of optimal filter elements.

31. The system of claim 29, wherein filter elements of the first and second interpolations are rational approximations of optimal filter elements.

32. The system of claim 29, wherein the filter elements of the first and second decimation and first and second interpolation filters are dyadic rational approximations of optimal filter elements.

33. An apparatus with one of two jointly-defined components of an optimal Laplacian pyramid processing system (OLaPPS), comprising:
- a signal processing device configured to receive, store, manipulate and forward uni- and multi-dimensional discrete digital signals; and
- a decimation filter component of a Laplacian pyramid processing system associated with said signal processing device for processing digital signal elements selected from a set of dimensions from one or more of the uni- and multi-dimensional discrete digital signals, the decimation filter component having a high-resolution signal as an input and a decimation or coarse approximation signal as an output,
- wherein the decimation signal retains maximum energy.

34. The apparatus of claim 33, wherein filter elements of the decimation filter component are rational approximations of optimal filter elements.

35. The apparatus of claim 34, wherein the filter elements are dyadic rational approximations of the optimal filter elements.

36. The apparatus of claim 34, wherein the decimation filter component has an integer length in the range of 5-17 taps.

37. An apparatus with one of two jointly-defined components of an optimal Laplacian pyramid processing system (OLaPPS), comprising:
- a signal processing device configured to receive, store, manipulate and forward uni- and multi-dimensional discrete digital signals; and
- an interpolation filter component of a Laplacian pyramid processing system associated with said signal processing device for processing digital signal elements selected from a set of dimensions from one or more of the uni- and multi-dimensional discrete digital signals, the interpolation filter component having a decimation or coarse approximation signal as an input and a reconstructed signal as an output,
- wherein the reconstructed signal has minimum mean square error relative to an original high resolution signal.

38. The apparatus of claim 37, wherein filter elements of the interpolation filter component are rational approximations of optimal filter elements.

39. The apparatus of claim 38, wherein the filter elements are dyadic rational approximations of the optimal filter elements.

40. The apparatus of claim 38, wherein the interpolation filter component has an integer length in the range of 5-17 taps.

41. An apparatus with an optimal Laplacian pyramid processing system (OLaPPS), comprising:
- a signal processing device configured to receive, store, manipulate and forward uni- and multi-dimensional discrete digital signals; and
- a Laplacian pyramid processing system associated with said signal processing device for processing digital signal elements selected from a set of dimensions from one or more of the uni- and multi-dimensional discrete digital signals, the processing system comprising:
  - a Laplacian pyramid decomposition stage, including
    - a first decimation having a signal as an input and a coarse approximation of the signal as an output, and
    - a first interpolation having the coarse approximation as an input and whose output is subtracted from the signal to result in a detail signal;
  - an intermediate stage; and
  - a Laplacian pyramid reconstruction stage, including
    - a second interpolation having the coarse approximation as an input and whose output is summed with the detail signal to result in a first reconstruction stage signal;
    - a second decimation having the first reconstruction stage signal as an input and whose output is subtracted from the coarse approximation to result in a second reconstruction stage signal; and a prediction having the second reconstruction stage signal as an input and whose output is summed with the first reconstruction stage signal to result in a reconstructed signal as an output,
wherein the first decimation retains maximum energy in the coarse approximation and the reconstructed signal is simultaneously a minimum mean square error approximation of the original signal.

42. The apparatus of claim 41, wherein the filter elements of the first and second decimation and first and second interpolation filters are dyadic rational approximations of optimal filter elements.

* * * * *